United States Patent [19]

Larson

[11] Patent Number: 4,912,505

[45] Date of Patent: Mar. 27, 1990

[54] CONTRAST CONTROL DEVICE FOR A SLIT-TYPE COPIER EXPOSURE SYSTEM

[75] Inventor: Brent D. Larson, Bellbrook, Ohio

[73] Assignee: The Mead Corporation, Dayton, Ohio

[21] Appl. No.: 327,879

[22] Filed: Mar. 23, 1989

[51] Int. Cl.$^4$ .................. G03B 27/54; G03B 27/72
[52] U.S. Cl. .................................. 355/70; 355/71
[58] Field of Search ............. 355/70, 71, 228–230

[56] References Cited

U.S. PATENT DOCUMENTS

| | | | |
|---|---|---|---|
| 3,528,737 | 9/1970 | Denner | 355/70 X |
| 3,619,055 | 11/1971 | Archer et al. | 355/70 X |
| 4,257,086 | 3/1981 | Gulliksen | 355/71 X |
| 4,364,658 | 12/1982 | Seto et al. | 355/70 X |
| 4,387,985 | 6/1983 | Magin et al. | 355/71 |
| 4,668,081 | 5/1987 | Imamura | 355/70 |
| 4,682,277 | 7/1987 | Yazaki | 355/71 X |

Primary Examiner—Richard A. Wintercorn
Attorney, Agent, or Firm—Thomas A. Boshinski

[57] ABSTRACT

An original document exposure device utilizes a bump exposure to control contrast by reducing the contrast in a reproduction image of the original document. The bump exposure is achieved by covering a portion of the field of view of the focusing system of an exposure lamp with a diffuse reflector. A portion of the exposure light is thus diffusely reflected into the focusing system and onto the photosensitive media. The degree of bump achieved is controlled by position adjustment of the reflector.

6 Claims, 2 Drawing Sheets

CONTRAST CONTROL DEVICE FOR A SLIT-TYPE COPIER EXPOSURE SYSTEM

BACKGROUND OF THE INVENTION

The present invention relates generally to exposure systems used in illuminating original documents for copying and, more particularly, to such a system wherein the original is scanned by a slit of exposure light. The invention provides a means for regulating contrast in the reproduction image produced using the exposure system.

A number of copying devices are known wherein an original document is illuminated and the illumination is directed onto a photosensitive media to produce an image. A variety of photosensitive surfaces may be used, such as a charged photosensitive drum in the case of conventional xerography. As further examples, other media may be used such as conventional photographic film or a micro-encapsulated photosensitive media such as that disclosed in U.S. Pat. Nos. 4,440,846 and 4,399,209.

A common method of illuminating the original document is by scanning the document with a slit of exposure light. In a typical prior art arrangement, a linear light source positioned within a parabolic cylinder reflector directs a slit of light onto the plane within which the original is held. The light is reflected from the original and collected by a lens or other focusing means, whereafter it is directed onto the photosensitive media. The light source and focusing system may be moved together past the original to scan the document, or the original may be moved past the light source and focusing system.

In such a copying device, it is advantageous to be able to control the contrast level in the output image. While high contrast is desirable in images comprising text or line drawings, such high contrast results in low quality reproductions when copying continuous tone originals. Since a particular copying apparatus may be expected to reproduce originals of either type, control of contrast would greatly enhance the capabilities of the apparatus.

It is known that contrast can be reduced through the use of a "bump" exposure. Such an exposure is an overall, nonimage exposure of the photosensitive media. This exposure has the effect of reducing or softening the contrast of the image once the exposure is made. The bump exposure can be carried out prior to, after or simultaneous with the image exposure.

It is desirable to be able to control the extent of the bump exposure so as to control contrast. With a fixed bump exposure, the reproduction image can be unacceptably low in density in areas of the image such as text or line graphics. A controlled bump can be provided using means such as an auxiliary bump light source, or by providing separate bump and image exposures using the same light source. These techniques have disadvantages, however, in that the required control systems add cost and complexity to the copying apparatus. In the case of an auxiliary lamp, further cost and complexity is added through the additional light source. Where separate bump and image exposures are made, the time required to produce an image is increased. In either case, the power requirements of the apparatus are increased.

What is needed, therefore, is a convenient means by which to provide a controlled bump exposure for contrast control in a reproduction image. Such a means should be easily controllable, and yet add relatively little to the cost and complexity of the reproduction apparatus.

SUMMARY OF THE INVENTION

In meeting the foregoing needs, the present invention provides an original document exposure device wherein a bump exposure is used to control contrast by reducing the contrast in a reproduction image of the original document. The bump exposure is achieved by covering a portion of the field of view of the focusing system of an exposure lamp with a diffuse reflector. A portion of the exposure light is thus diffusely reflected into the focusing system and onto the photosensitive media. The degree of bump achieved is controlled by position adjustment of the reflector.

In accordance with this concept, the invention provides an original document exposure device including means for supporting an original. A slit exposure system for illuminating a slit area on the original includes a light source for directing exposure light onto a supported original, as well as means for directing reflected exposure light from within a field of view of the original toward a photosensitive media. Means is provided for producing relative motion between the original supporting means and the exposure system to scan the exposure light and the field of view of the directing means over the original.

A diffuse reflector means receives a portion of the exposure light from the light source and diffusely reflects such light. An adjustable reflector positioning means positions the reflector means between the supporting means and the exposure system to block a portion of the field of view of the directing means. The adjustable reflector positioning means further is able to adjust the relative portion of the field of view blocked by the reflector means. This latter feature of the adjustable reflector positioning means may include means for selectively moving the reflector means into and out of the field of view.

Accordingly, it is an object of the present invention to provide a document reproduction system wherein contrast in the reproduction image may be controlled; to provide a device for exposing an original document for purposes of reproduction in which contrast may be controlled; to provide such a device wherein contrast control is achieved through the use of a bump exposure; and to provide such a device in which control of the bump exposure is achieved simply and inexpensively.

Other objects and advantages of the present invention will be apparent from the following description, the accompanying drawings and the appended claims.

DETAILED DESCRIPTION OF THE PREFERRED EMBODIMENT

Figure 1:
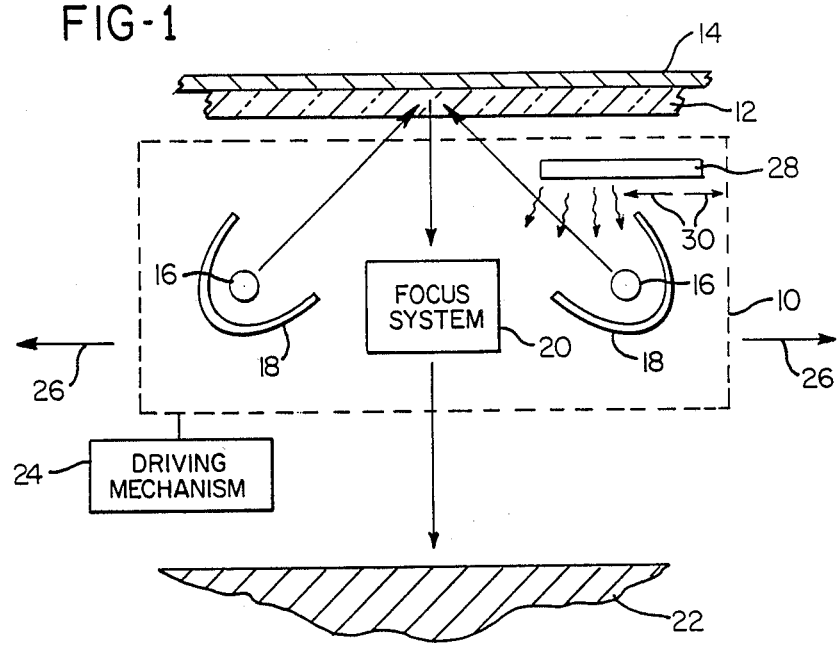
FIG. 1 is a schematic view of the contrast control device according to the present invention.

One embodiment for the original document exposure system in accordance with the present invention may be seen by reference to FIG. 1. A scanning exposure system 10 is positioned beneath a glass plate 12 onto which an original document may be placed in a face down position. The scanning system 10 includes one or more (two shown) exposure lamp sources 16. These linear sources are positioned within parabolic cylindrical reflectors 18 which direct the exposure light onto the underside of glass plate 12 wherein a slit-like area of original document 14 is illuminated. The exposure light is reflected into a focus system 20, which focuses the slit exposure area onto a photosensitive surface 22. An appropriate driving mechanism 24 is coupled to scanning system 10 so that, in a manner well known in the art, the entire scanning system 10 may be moved as shown by arrows 26 to scan the slit-like exposure area over the entire original document 14.

Lamps 16 are of a known type appropriate for the photosensitive surface 22 which is to be exposed. Such surface may e a charged photosensitive plate as in a conventional xerographic copier. As an alternative, surface 22 may be a micro-encapsulated photosensitive media such as that disclosed in U.S. Pat. Nos. 4,440,846 and 4,399,209. In such a media, the imaging sheet comprises a supportive substrate for the layer of microcapsules on the surface thereof. The microcapsules have an internal phase of a photohardenable photosensitive composition and a color former. The microcapsules are imagewise exposed to actinic radiation and ruptured so that the color former reacts with a developer material to produce an image.

U.S. Pat. No. 4,399,209 discloses the photosensitive media as a transfer imaging system. The imaging sheet is contacted with a receiver sheet subsequent to exposure. The receiver sheet includes a developer sheet having a support with a layer of developer material on the surface thereof. After the sheets are placed in contact, rupturing of the microcapsules is carried out. U.S. Pat. No. 4,440,846 discloses a self-contained imaging system wherein the imaging sheet has developer material co-deposited with the microcapsules on the sheet's surface.

The focus system 20 may be any of those well known in the art typically used with scanning slit-type copiers. For example, a Selfoc TM lens array may be used. As an alternative, a spherical lens may be used.

Further, while the particular embodiment described herein is one wherein the original document remains stationary while the light sources and focusing system are scanned, it will also be recognized that these latter portions may be held stationary while the original document and photosensitive surface are scanned. Both techniques are well known in the copier art.

In the present invention, reduction of contrast is achieved through the use of a bump exposure. The extent of this bump exposure is controllable to provide contrast control. The bump exposure is accomplished by covering a portion of the field of view of the focus system 20 with a diffuse light reflector 28. Such a reflector may be any appropriate diffusely reflective surface, such as a metal plate which has been painted white. The extent of the bump exposure is controlled by position adjustment of plate 28 in directions as indicated by arrows 30. A portion of the exposure light from lamps 16 strikes plate 28 and is diffusely reflected. Of the reflected light, a portion is received by the focus system 20 and directed onto the photosensitive surface 22. By adjusting the portion of the field of view of the original document 14 which is covered by plate 28, the extent of the bump exposure is regulated. From 0 to 100% bump exposure is possible by moving the plate out of view or totally covering the field of view of the focus system.

While shown spaced apart in FIG. 1 for greater clarity, plate 28 should preferably be located relatively close to glass plate 12 and document 14.

Any appropriate simple adjustment mechanism may be used, depending upon the detailed construction of the copier device and the particular exposure and focus systems which are used. In general, once the relative position of plate 28 with respect to lamps 16 and focus system 20 is set, this relative position of the plate 28 should remain fixed. However, there may be cases wherein movement of plate 28 may be desired, such as when copying an original having both text and graphics portions.

Figure 2:
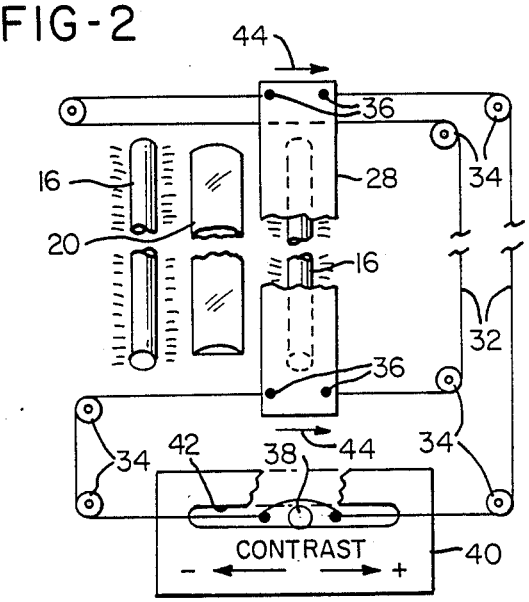
FIG. 2 is a top plan, partially schematic view of a mounting and adjusting arrangement for the diffuse reflector of the contrast control device.

One arrangement for adjusting the position of plate 28 can be seen by reference to FIG. 2. It should be recognized that the entire apparatus shown in FIG. 2 is fixed in position relative to the exposure lamps and focus system. In the embodiment shown in FIG. 1, wherein the scanning system 10 moves with respect to the original document 14, the adjustment apparatus shown in FIG. 2 is mounted as a portion of the scanning system 10.

A cable 32 is provided to extend around a plurality of pulleys 34 in the manner shown in FIG. 2. Plate 28 is attached to cable 32 by appropriate attachment means 36. Cable 32 and plate 28 are positioned above lamps 16 (reflectors 18 having been omitted from FIG. 2 for clarity) and the focus system 20.

An adjustment lever 38 is attached to cable 32 so as to be movable in either direction along the line and defined by cable 32. A guide plate 40 having a slot 42 through which lever 38 extends is mounted above cable 32. Movement of lever 38 in a direction to the left as viewed in FIG. 2 will result in movement of plate 28 as shown by arrows 44 to reduce the reflected bump light and hence to increase contrast. Opposite movement of lever 38 produces opposite results. By appropriate movement of lever 38, the extent to which plate 28 blocks the field of view of focus system 20 may be adjusted.

Figure 3:
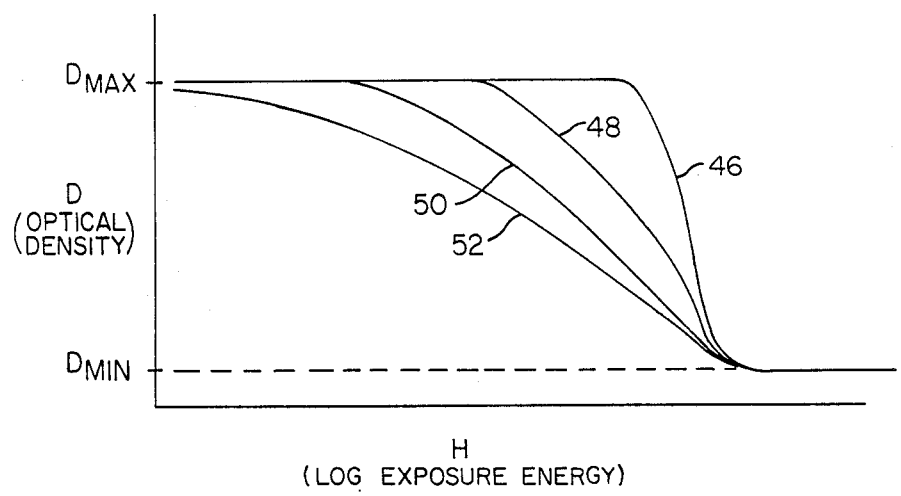
FIG. 3 is s ploy showing optical density (D) in a reproduction image as a function of the logarithm of exposure energy applied (log E) to illustrate the effect of the contrast control device.

The expected effect of the bump exposure for contrast control can be seen by reference to FIG. 3, wherein the optical density (D) of a reproduction image is shown as a function of the log of exposure energy (Log E). While similar curves can be expected with other photosensitive media, the curves shown in FIG. 3 are particularly intended to illustrate the performance of the micro-encapsulated photosensitive media described above. Curve 46 shows the performance of the media in the absence of any bump exposure. The high average slope of the curve between the $D_{min}$ and $D_{max}$ values can be seen to be relatively steep. Curves 48, 50 and 52 illustrate increasing levels of bump exposure, and therefore a decreased level of contrast. It can be seen that as the amount of bump exposure is increased, the average slope of the curves shown in FIG. 3 are reduced.

One advantage of the apparatus disclosed herein is that the bump exposure is the same lamp as that providing actinic radiation for imagewise exposure. Thus, once the light source and media are properly matched, proper matching is also present for the bump exposure. Such matching can be difficult where and auxiliary lamp is used to achieve a bump exposure.

It should also be noted from FIG. 3 that the toe exposure level to reach $D_{min}$ is independent of the amount of bump exposure utilized for contrast control. Thus, an independent lightness control can be provided to enhance the flexibility of the control system.

As an alternative to white diffuse reflectors, colored plates 28 or a color filter positioned in front of plate 28 can be used to affect the color content of the bump exposure. Such an approach may be desirable for further control over the quality of the output image, although additional complexity would be added to the device.

Finally, it can also be noted from FIG. 3 that while the device of the present invention affects the average slope of the illustrated curves, the shape of the curves change in a predetermined manner and complete control over the curve shape is not possible. However, the disadvantage of a lack of such control is believed to the offset by the low complexity, cost and energy requirements of the contrast control system disclosed herein.

While the forms of apparatus herein described constitute preferred embodiments of this invention, it is to be understood that the invention is not limited to these precise forms of apparatus and that changes may be made therein without departing from the scope of the invention which is defined in the appended claims.

What is claimed is:

1. An original document exposure device, comprising:
    means for supporting an original;
    a slit exposure system for illuminating a slit area on the original, said exposure system including a light source for directing exposure light onto a supported original and means for directing reflected exposure light from within a field of view of the original toward a photosensitive media;
    means for producing relative motion between said original supporting means and said exposure system to scan said exposure light and said field of view over the original;
    diffuse reflector means for receiving a portion of the exposure light from said light source and diffusely reflecting said exposure light; and
    adjustable reflector positioning means for positioning said reflector means between said supporting means and said exposure system to block a portion of said field of view, and to adjust the relative portion of said field of view blocked by said reflector means.

2. A device as defined in claim 1, wherein said adjustable reflector positioning means includes means for selectively moving said reflector means into and out of said field of view.

3. A device as defined in claim 2, wherein said original supporting means includes a planar support for the original, said diffuse reflector means defines a planar reflective surface, said reflective surface being disposed in a first plane parallel to said planar support, and wherein said selective moving means moves said reflective surface within said first plane.

4. A device as defined in claimed 3, wherein said selective moving means moves said reflective surface perpendicular to said slit.

5. A device as defined in claim 3, wherein said diffuse reflector means is a planar reflector plate.

6. A device as defined in claim 5, further comprising means for selectively moving said plate in a direction perpendicular to said slit.

* * * * *